Aug. 17, 1965 R. E. CARPENTER 3,201,270
INORGANIC COLORING MATERIALS
Filed Dec. 20, 1961

INVENTOR.
ROBERT E. CARPENTER
BY
Cushman, Darby & Cushman
ATTORNEYS

3,201,270
INORGANIC COLORING MATERIALS
Robert E. Carpenter, Baltimore, Md., assignor to Pemco Division, The Glidden Company, Baltimore, Md., a corporation of Ohio
Filed Dec. 20, 1961, Ser. No. 160,885
15 Claims. (Cl. 106—302)

This application is a continuation-in-part of Serial No. 859,562, filed Dec. 15, 1959, now abandoned.

The present invention relates to stains used as coloring agents in glazes and specifically to black stains compounded through the admixture and reaction at high temperature of the oxides of cobalt, chromium, and iron.

Stains may be used to impart their color to glazes in the following three fashions:

(1) They may be applied directly to a ceramic body as a so-called underglaze color or as an engobe, in which case they will normally be fired and then covered with a clear glaze which is applied and fired, allowing the color to show through from the underglaze.

(2) They may be incorporated in the glaze and matured with it, thereby producing, in the present case, a black glaze.

(3) They may be applied as an overglaze; that is, admixed with a low-melting flux and applied over the fired glaze as a decoration in line or pattern and refired at a temperature considerably lower than that at which the glaze is matured.

Various inorganic coloring materials or pigments are used for the above purpose, and the color produced depends upon the composition of the pigment, well-known materials being used for such colors as blue, green, red and so forth. The composition determines the intensity of the color as well as its shade and new compositions are constantly sought to provide more intense coloring or new shades.

A number of black pigments are known such as various mixtures of black inorganic oxides. In particular, black pigments manufactured by high temperature reaction in the solid state of admixtures of various metallic oxides, particularly the oxides of cobalt, chromium and iron have been found useful. However, these compositions are not wholly satisfactory in that the intensity of blackness is not sufficiently deep, and undesirable shades may be obtained depending upon the composition of the glaze.

The present invention overcomes these difficulties by providing a pigment which shows a significantly improved degree of blackness and more neutral shades (that is, less tendency to blue or brown) through the addition to the oxides of iron, chromium, and cobalt of certain boron oxide containing compounds.

Accordingly, it is the principal object of the present invention to provide an improved black pigment or stain for use in combination with a wide variety of glazes and as an underglaze and an overglaze.

It is a further object of this invention to provide a new inorganic black pigment comprising the reaction product of the oxides of cobalt, chromium and iron and a boron material containing the $B_2O_3$ grouping.

An additional object of the invention is to provide a new inorganic black pigment consisting essentially of the reaction product of cobalt oxide, chromic oxide, ferric oxide, and a boron material containing the $B_2O_3$ grouping.

Other objects of the present invention will be apparent from the following detailed description of preferred embodiments and from the claims.

Figure 1:
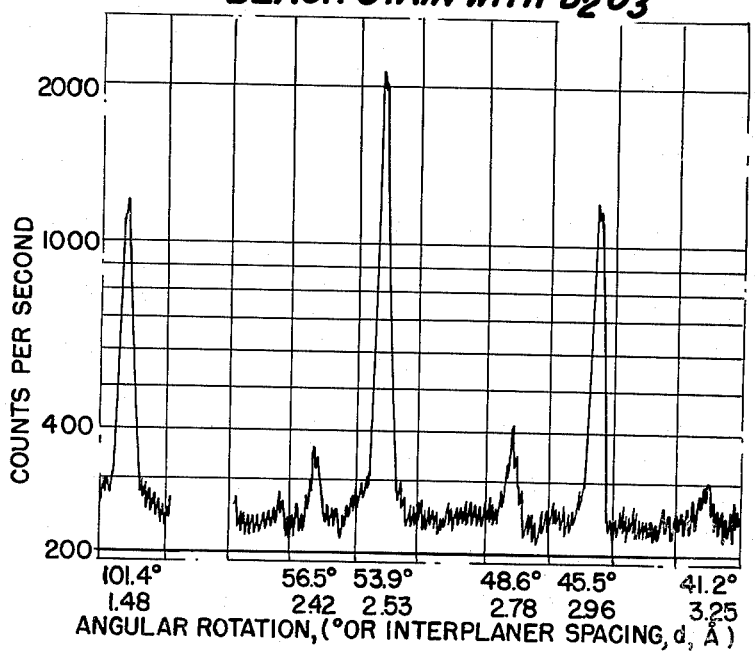
FIGURE 1 is an X-ray diffraction analysis of a boron-containing black stain made in accordance with the principles of the present invention.

According to the present invention, certain types of boron compounds characterized by the presence of $B_2O_3$ are blended with the oxides of cobalt, chromium and iron and the mixture pulverized to complete the blending and to reduce the particle size. The pulverized material is then heat-treated, or calcined, to effect a solid state reaction between the oxide components. After cooling, the resulting pigment is pulverized and is then ready for use either for incorporation in a wide variety of glazes as a stain or as an underglaze or an overglaze color. It is believed that the $B_2O_3$ effectively ties up the chromium oxide in the pigment to prevent its reaction with zinc in certain glazes thereby improving the color intensity and shade of the stained glaze. Further, the presence of the $B_2O_3$ significantly improves the reaction between the three metal oxide components.

The chromium, iron and cobalt oxides used in the present invention are normally chromic oxide ($Cr_2O_3$), ferric oxide ($Fe_2O_3$) and cobaltous-cobaltic oxide ($Co_3O_4$). The relative amounts of the oxides employed, based on the total weight of the oxides as expressed in weight percent are about 15% to about 45% cobalt oxide with 36% being optimum, about 20% to about 40% chromium oxide with 31% being optimum and about 20% to about 45% iron oxide with 33% being optimum. While the oxides are preferred, it is contemplated that salts such as the nitrates or carbonates, which form the oxides upon being heated, can also be employed.

The $B_2O_3$ is preferably added as boric acid, this being the simpler method of addition. Among the other boron compounds which can be used are sodium tetraborate (borax) in the hydrated or dehydrated form, potassium tetraborate, ammonium pentaborate, colemanite (a calcium borate material), Gerstley borate (a calcium borate material), and hydrated or dehydrated razorite (in amount sufficient to provide from .25% to 5% based on the total amount of the pigment). These materials all contain the $B_2O_3$ grouping and the relative amount of this $B_2O_3$ in the materials can be determined by resolving the formula, as described in the Encyclopedia of Chemical Technology (1949), volume 2, page 601, to the Berzalin or resolved formula. In this formula, the $B_2O_3$ is separated out from the other atoms of the borate molecule. For example, the formula for boric acid, $H_3BO_3$ can be rewritten $B_2O_3 \cdot 3H_2O$. To determine the relative $B_2O_3$ content, the molecular weight of $B_2O_3$ is divided by the total molecular weight of the molecule. For example, boric contains 56.5% $B_2O_3$ and dehydrated sodium tetraborate contains 68.7% $B_2O_3$.

It is the presence of the $B_2O_3$ grouping in the boron compound which makes it effective to improve the intensity and shade of the pigments, and preferably the $B_2O_3$ should be present in an amount of at least about 0.25% of the total amount of metal oxides in the pigment. For economic reasons, it is desirable to avoid the use of more than about 4 to 50% $B_2O_3$. Preferably about 1 to about 2.5% $B_2O_3$ should be used. In terms of the amount of boric acid this is the equivalent of using at least 0.5% boric acid to about 8% or 9% and preferably between about 2% and 5%. Of course, correspondingly smaller amounts of, for example, dehydrated borax, can be used since such borax contains a higher percentage of $B_2O_3$ than does boric acid.

In general, the composition limits may be summarized as follows, the percentages being expressed as weight percent based on the weight of the metal oxides.

Cobaltous-cobaltic oxide ($Co_3O_4$), from 15 to 45%, 36% optimum.
Chromic oxide ($Cr_2O_3$), from 20 to 40%, 31% optimum.
Ferric oxide ($Fe_2O_3$), from 20 to 45%, 33% optimum.
$B_2O_3$ equivalent, from .25 to 5 lbs. per 100 lbs. metal oxides.

The blending, pulverizing and calcining of the oxide mixture may be carried out by conventional processes so long as the desired reaction is obtained. The blending and pulverizing steps are for the purpose of obtaining a large area of contact between the components and may be carried out, respectively, with a conventional mechanical blender (such as a V blender, a cone blender or the like) and with a high-speed hammer mill (such as a "Mikro-Pulverizer"). A medium screen may be used with the latter in order to complete the blending and to help reduce the particle size, preferably to a particle size of less than about 4 microns.

The pulverized material is then loaded into refractory crucibles or saggers and heat treated so that it receives the thermal equivalent of three hours of heat treatment at a temperature of 2000° F. The purpose of the heat treatment is to cause a solid state reaction between the various metal oxide components, resulting in the formation of a series of complex spinels. The heat treatment may be carried on in any normal way (as, for example, in refractory crucibles or saggers loaded into a periodic down-draft kiln, or onto the cars of a continuous tunnel kiln, or finally, by any other practical method such as a rotary refractory-lined calcining furnace). Precise time and temperature of heat treatment are not critical but may be varied as necessary by those skilled in the art to obtain the desired solid state reaction. Thus, for example, if the time of calcination be increased or decreased, the temperature can normally be decreased or increased, respectively, by about 200° F. Also, heat input of furnaces and kilns differ due to fuel, burner efficiency, design, and even due to age and condition of refractories.

The calcined stain, after removal from the furnace, is cooled, crushed, and again micropulverized in order to reduce the particle size to a state well below 44 microns. In this condition it is ready to be used either for incorporation in a glaze as a stain or for use as an underglaze or overglaze color. In general, the stain may be used with glaze compositions firing between about 1850° F. and about 2350° F.

The methods of applying decorations to ceramic ware are manifold and in no way limit the present invention which is concerned solely with the development of an improved black stain which may be used with a wide variety of glaze compositions matured over a very considerable range of temperatures. For example, the stain of the present invention may be incorporated with a suitable flux to provide an overglaze decoration melting and maturing at a temperature of approximately 1300°–1400° F.; or it may be incorporated in a glaze to decorate art pottery maturing at a temperature of 1600°–2000° F.; or it may be used to decorate commercial dinnerware and other products maturing at temperatures in the neighborhood of 2100°–2200° F. or higher. A full disclosure of glazing techinques may be found in United States Patent No. 2,835,601. The glazes in which the black stains are incorporated include those containing zinc as well as zinc-free glazes.

The invention is further described and illustrated by the following examples.

EXAMPLE I

The following ingredients were mechanically blended to form a mixture containing 2.8% $B_2O_3$ based on the weight of the metal oxides:

| | Parts by weight |
|---|---|
| $Co_3O_4$ | 36 |
| $Cr_2O_3$ | 31 |
| $Fe_2O_3$ | 33 |
| $H_3BO_3$ | 5 |

The blended materials were passed through a high-speed hammer mill using a medium screen in order to complete the blending and to help reduce the particle size to below 4 microns. The milled material was then placed in a refractory crucible and calcined in a furnace for 3 hours at about 2000° F. The calcined material, or stain, was removed from the furnace, allowed to cool and milled to the particle size below 44 microns.

A second strain was made in the same manner and from the same materials except that no boron-containing material was included.

A conventional zinc-containing glaze having the following molecular formula was procured:

| | | | |
|---|---|---|---|
| $K_2O$ | 0.07 | $Al_2O_3$ | 0.20 |
| $Na_2O$ | 0.18 | $B_2O_3$ | 0.26 |
| CaO | 0.29 | $SiO_2$ | 2.43 |
| ZnO | 0.32 | PbO | 0.14 |

100 parts by weight of the above glaze were mixed with 100 parts by weight of the boron-containing stain. The mixture was applied over a clay surface and then fired at 2000° F. for 1 hour.

The two samples of fired glaze were compared with a spectrophotometer, specifically with a General Electric recording spectrophotometer with automatic tristimulus integrator, with the following results—

Zn glaze; boron-free stain:
    Reflectance _____percent__ 1.47
    Purity _____do__ 43
    Dominant wave length _____millimicrons__ 581

Zn glaze; boron-containing stain:
    Reflectance _____percent__ 0.45
    Purity _____do____ 22
    Dominant wave length _____millimicrons__ 582

From the above comparison, it was apparent that the glaze containing the boron stain showed a lower reflectance and a higher purity than did the glaze containing the boron-free stain. When compared visually, the glaze containing the boron stain appeared blacker than the glaze containing the boron-free stain, the latter having a color toward brown.

EXAMPLE 2

A conventional zinc-free glaze having the following molecular formula was obtained:

| | | | |
|---|---|---|---|
| $K_2O$ | 0.09 | $Al_2O_3$ | 0.19 |
| $Na_2O$ | 0.09 | $B_2O_3$ | 0.36 |
| CaO | 0.58 | $SiO_2$ | 2.8 |
| PbO | 0.24 | | |

The boron-containing and boron-free stains of Example 1 were mixed with the above glaze, fired and compared, following the procedures described in Example 1.

The following results were obtained—

Zn-free glaze; boron-free stain:
    Reflectance _____percent__ 0.54
    Purity _____do____ 15
    Dominant wave length _____millimicrons__ 498

Zn-free glaze; boron-containing stain:
    Reflectance _____percent__ 0.27
    Purity _____do____ 8
    dominant wave length _____millimicrons__ 488

Again it was apparent that the glaze containing the boron stain showed a lower reflectance and a higher purity than did the glaze containing the boron-free stain. The improvement was apparent upon visual comparison of the samples because the glaze containing the boron appeared blacker. Specifically, the shade of black was toward the bluish-green while the boron-free stain gave a greener shade.

EXAMPLE 3

The procedures of Examples 1 and 2 were repeated using stains of the same metal oxide ratios and containing 5 parts by weight per 100 parts of metal oxides of sodium tetraborate (borax) in dehydrated form, potassium tetraborate, ammonium pentaborate, and hydrated and dehydrated razorite. Visual comparisons of the fired samples showed improved results as in Examples 1 and 2.

EXAMPLE 4

An X-ray analysis of each of the stains of Example 1 was made using powder diffraction techniques with a recording X-ray diffractometer. With this apparatus, the specimen to be analyzed is mounted in a goniometer and a continuous record of the intensity of X-ray reflection from the specimen into a Geiger counter is made as the specimen is rotated in an X-ray beam, the counts per second (c.p.s.) indicated by the counter being a measure of the intensity of X-ray reflection. When the counts per second versus degrees of rotation of the specimens are recorded, a comparison of the graphs provides a means of determining the comparative amounts of crystalline material of a definite type present in the specimens. Peaks of intensity at the same interplanar crystal spacings (calculated from the degree of rotation with the aid of the Bragg law) indicate the presence of the same crystalline material. The height of the peaks, or the magnitude of the intensity, indicates the degree of crystal perfection or the relative amount of that particular crystalline phase present.

Figure 2:
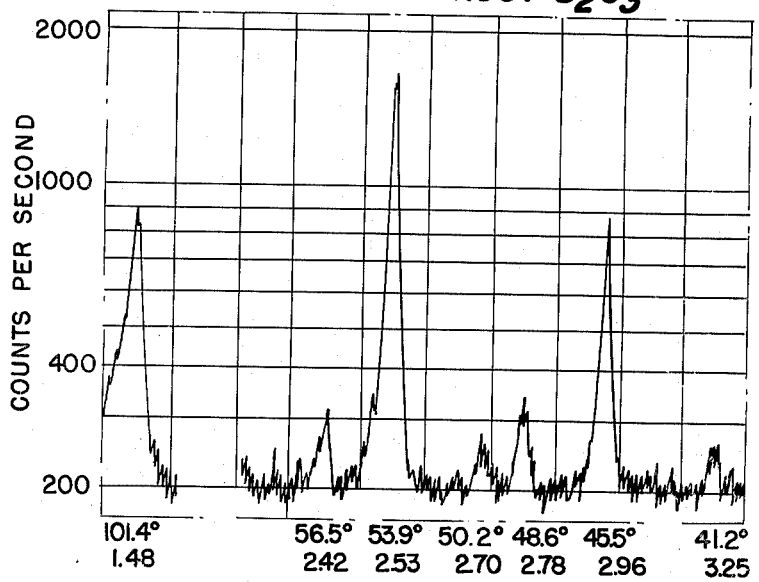
FIGURE 2 is an X-ray diffraction analysis of a boron-free stain which is otherwise the same as the stain of FIGURE 1.

FIGURES 1 and 2 are X-ray diffraction tracings produced from the boron stain and the boron-free stain, respectively, in angular areas of 40° to 60° and 100° to 105°. Angular displacement or interplanar spacing, is plotted horizontally, and intensity of reflection is plotted vertically.

Two major differences between the stains are obvious from an examination of FIGURES 1 and 2. Firstly, all of the intensity peaks are higher in the boron-containing material, indicating better crystalline development or a larger quantity of the particular crystalline phases developed during the calcining operation. Secondly, the boron-free stain shows a small intensity peak at an interplanar spacing of 2.70 which is not present in the boron-containing stain. This peak corresponds with one found in $\alpha \cdot Fe_2O_3$ and therefore indicates the presence of this material in the boron-free stain.

The higher intensities resulting from the presence of boron are further emphasized by Tables I and II below.

*Table I*

| Spacing "d", A. | Intensity (c.p.s.) Without $B_2O_3$ | Intensity (c.p.s.) With $B_2O_3$ | Intensity Ratio |
|---|---|---|---|
| 4.85 | 230 | 260 | 14 |
| 3.25 | 80 | 100 | 5 |
| 2.96 | 780 | 930 | 47 |
| 2.78 | 160 | 230 | 10 |
| 2.70 | 80 | | 5 |
| 2.53 | 1,580 | 2,080 | 100 |
| 2.42 | 110 | 140 | 7 |
| 2.30 | 20 | 40 | 1+ |
| 2.09 | 400 | 500 | 24 |
| 1.77 | 60 | 80 | 4 |
| 1.71 | 230 | 305 | 15 |
| 1.61 | 550 | 780 | 36 |
| 1.48 | 730 | 980 | 46 |
| 1.32 | 120 | 180 | 8 |
| 1.28 | 250 | 330 | 16 |
| 1.26 | 130 | 140 | 7 |
| 1.21 | 100 | 140 | 6 |

*Table II (d=2.53 A.)*

| | Intensity (c.p.s.) Without $B_2O_3$ | With $B_2O_3$ |
|---|---|---|
| Sample 1 | 1,325 | 1,771 |
| Sample 2 | 1,720 | 1,863 |
| Sample 3 | 1,458 | 2,061 |
| Sample 4 | 1,328 | 1,915 |
| Sample 5 | 1,325 | 1,815 |
| Average | 1,431 | 1,885 |

Average gain in intensity due to presence of boron =31.7%.

Table I shows the intensities measured for each reflection plotted in FIGURES 1 and 2 and the intensity ratios calculated using an interplanar spacing (d) of 2.53 as the 100% reflection basis. In every case except when d equals 2.70, the higher intensity of the boron stain is apparent. When d equals 2.70, no reflection is obtained with the boron stain, indicating that the composition having that interplanar spacing is not present.

Table II shows the intensities measured at the maximum intensity peak (d=2.53) for five different samples containing $B_2O_3$ and for five samples without $B_2O_3$. The average intensity is more than 30% greater in samples containing boron than those in which it was not present.

It is concluded from the X-ray analysis of the stains that the calcining of the metal oxides suitably admixed results in a solid solution reaction with the formation of a mixture of spinels including $FeO \cdot Fe_2O_3$, $CoO \cdot Cr_2O_3$, $FeO \cdot Cr_2O_3$, $CoO \cdot Fe_2O_3$ and $CoO \cdot Co_2O_3$. These spinels are present in both the boron-containing stain and the boron-free stain. However, it is indicated that when boron is present, the crystals of the spinels are much more numerous, the intensity of the reflected radiation being increased by some 31%, and that the crystals are slightly larger. In both stains only a minor amount of $$CoO \cdot Co_2O_3$$

is present; although it was one of the initial ingredients, it has apparently almost completely decomposed to form cobalt ferrite and cobalt chromite.

The boron-containing stain does not show any of the original ferric oxide and chromic oxide components. Since iron oxide is known to be reduced by boron, it is believed likely that the iron oxide in the boron-containing composition has been converted to $FeO \cdot Fe_2O_3$ by the reaction $Fe_{24}O_{36} \rightarrow Fe_{24}O_{32}$. In the boron-free material, however, the stable $\alpha \cdot Fe_2O_3$ form has been maintained.

In general, it is concluded that the boric oxide has acted as a mineralizer to enhance the formation of the spinels mentioned above; and owing to its absence the stable $\alpha \cdot Fe_2O_3$ has not been converted to $FeO \cdot Fe_2O_3$ or another spinel, nor have the other spinels been developed to the extent in which they appear in the boron-containing stain.

While it is not intended that the invention should be limited by the mechanism of the chemical or physical reactions involved in making and using the stains, the results of certain comparative investigations have been given to establish the improved results obtained over stains which do not contain boron and to seek to explain the results. While preferred embodiments of the invention have been described, various changes and modifications may be made without departing from the scope of the invention, as set forth in the claims.

What is claimed is:

1. A starting material for use in making a black pigment consisting essentially of an intimate mixture of the oxides of cobalt, chromium and iron with a small amount of a boron-containing material containing the $B_2O_3$ grouping, said starting material containing between about 15% and about 45% cobalt oxide, between about 20% and about 40% chromium oxide, between about 20% and about 45% iron oxide, the percentages being expressed in weight percent of the total metal oxides, and said boron-containing material being present in an amount to supply between about 0.25% and about 5%, by weight, of $B_2O_3$ based on the weight of the metal oxides, said boron-containing material being selected from the group consisting of boric acid, the borates of the alkali metals, the borates of the alkaline earth metals and ammonium borate.

2. The composition of claim 1 wherein the boron-containing material is colemanite.

3. The composition of claim 1 wherein the boron-containing material is Gerstley borate.

4. The composition of claim 1 wherein the boron-containing material is boric acid.

5. The composition of claim 1 wherein the boron-containing material is ammonium pentaborate.

6. The composition of claim 1 wherein the cobalt oxide is $Co_3O_4$, the chromium oxide is $Cr_2O_3$ and the iron oxide is $Fe_2O_3$.

7. The composition of claim 1 containing about 36% cobalt oxide, about 31% chromium oxide, about 33% iron oxide and about 2.8% $B_2O_3$.

8. A method of preparing a black pigment comprising: intimately mixing oxides of cobalt, chromium and iron with a small amount of a boron-containing material containing the $B_2O_3$ grouping, said metal oxides being present in the following proportions, by weight:

cobalt oxide: about 15% to about 45%
chromium oxide: about 20% to about 40%
iron oxide: about 20% to about 45% said $B_2O_3$ being present in an amount between about 0.25% and about 5% by weight based on the weight of the metal oxides, said boron-containing material being selected from the group consisting of boric acid, the borates of the alkali metals, the borates of the alkaline earth metals and ammonium borate; calcining the mixture to effect a solid state reaction among the components and pulverizing the resulting product to insure uniformity and homogeneity.

9. A crystalline black pigment which is the calcination product of starting material which consists essentially of a mixture of the oxides of cobalt, chromium and iron with a small amount of a boron-containing material containing the $B_2O_3$ grouping, said oxide mixture containing between about 15% and about 45% cobalt oxide, between about 20% and about 40% chromium oxide, between about 20% and about 45% iron oxide, the percentages being expressed in weight percent of the total metal oxides, and said boron-containing material being present in the starting material in an amount to supply between about 0.25% and about 5%, by weight, of $B_2O_3$ based on the weight of the metal oxides, said boron-containing material being selected from the group consisting of boric acid, the borates of the alkali metals, the borates of the alkaline earth metals and ammonium borate.

10. A black pigment as in claim 9 having X-ray reflection peaks at particular interplanar distances, substantially all of said deflection peaks occurring at substantially the all of said reflection peaks and being of greater magnitude than the reflection peaks shown when said boron-containing material is omitted from said pigment.

11. A method as in claim 8 wherein said calcining step is carried out for the thermal equivalent of three hours of heat treatment at a temperature of 2000° F.

12. A method as in claim 8 wherein said calcining step is carried out at a temperature within about 200 degrees of 2000° F.

13. A method as in claim 8 wherein said pulverizing step reduces the particle size to below 44 microns.

14. A black pigment as in claim 10 showing a maximum X-ray reflection peak at an interplanar distance of about 2.53 A.

15. A black pigment as in claim 10 wherein all of said reflection peaks with the exception of a peak at an interplanar distance of 2.7, occur at substantially the same interplanar distances as the reflection peaks shown when said boron-containing material is omitted from said pigment, said black pigment showing no peak at an interplanar distance of 2.7 as compared to the boron-free pigment.

References Cited by the Examiner

UNITED STATES PATENTS 2,255,044   9/41   Deyrup _____ 106—49

TOBIAS E. LEVOW, *Primary Examiner.*

UNITED STATES PATENT OFFICE
CERTIFICATE OF CORRECTION

Patent No. 3,201,270 August 17, 1965

Robert E. Carpenter

It is hereby certified that error appears in the above numbered patent requiring correction and that the said Letters Patent should read as corrected below.

Column 2, line 56, after "boric" insert -- acid --; line 64, for "50%" read -- 5% --; column 4, line 73, for "dominant" read -- Dominant --; column 8, line 15, for "deflection" read -- reflection --; line 16, for "all of said reflection peaks" read -- same interplanar distances --.

Signed and sealed this 3rd day of May 1966.

SEAL)
Attest:

ERNEST W. SWIDER
Attesting Officer

EDWARD J. BRENNER
Commissioner of Patents